June 23, 1953  E. J. VOSLER  2,642,917
PRESSURE BAND FOR BRAKE LININGS
Filed Dec. 5, 1950  2 Sheets-Sheet 1

INVENTOR
EDWARD J. VOSLER
BY Willits, Hardman and Ker
HIS ATTORNEYS

June 23, 1953  E. J. VOSLER  2,642,917
PRESSURE BAND FOR BRAKE LININGS
Filed Dec. 5, 1950  2 Sheets-Sheet 2

INVENTOR
EDWARD J. VOSLER
BY Willits, Hardman and Oher
HIS  ATTORNEYS.

Patented June 23, 1953

2,642,917

UNITED STATES PATENT OFFICE 2,642,917

PRESSURE BAND FOR BRAKE LININGS

Edward J. Vosler, Dayton, Ohio, assignor to General Motors Corporation, Detroit, Mich., a corporation of Delaware Application December 5, 1950, Serial No. 199,262

9 Claims. (Cl. 154—1)

This invention relates to apparatus for facilitating the attachment of brake linings to a brake shoe.

Brake lining material is attached to a brake shoe in various ways, some by riveting the lining to the shoe and others by cementing it to the shoe. When cementing a lining to a brake shoe, a coating of some suitable adhesive material is applied to one or both of the contacting surfaces. To obtain proper bonding of the lining and shoe it is necessary to apply and maintain sufficient clamping force to hold the adjacent surfaces, with the adhesive therebetween, in intimate contact during the setting of the adhesive. When the character of the adhesive used requires heat to set it, the clamping means must be made of a material capable of withstanding the heat applied for setting the adhesive. In commercial production of brake shoes with cemented on linings, the clamping means are preferably constructed to facilitate application thereof to the shoe and to permit repeated use of the clamp.

Therefore it is among the objects of the present invention to provide a fixture including a heat resisting, flexible band which is adapted to be attached to the shoe for tightly holding the brake lining in intimate contact with the brake shoe during the heat applying process, said band being easily removable from the shoe after the adhesive is satisfactorily set and a suitable bond between the lining and shoe is established.

A further object of the present invention is to provide apparatus which will hold the shoe and lining and by means of which the aforementioned fixture may easily be attached to the brake shoe preparatory to the heating process and by means of which the band may just as easily be removed after completion of said heating process.

Further objects and advantages of the present invention will be apparent from the following description, reference being had to the accompanying drawings wherein a preferred embodiment of the present invention is clearly shown.

Figure 1:
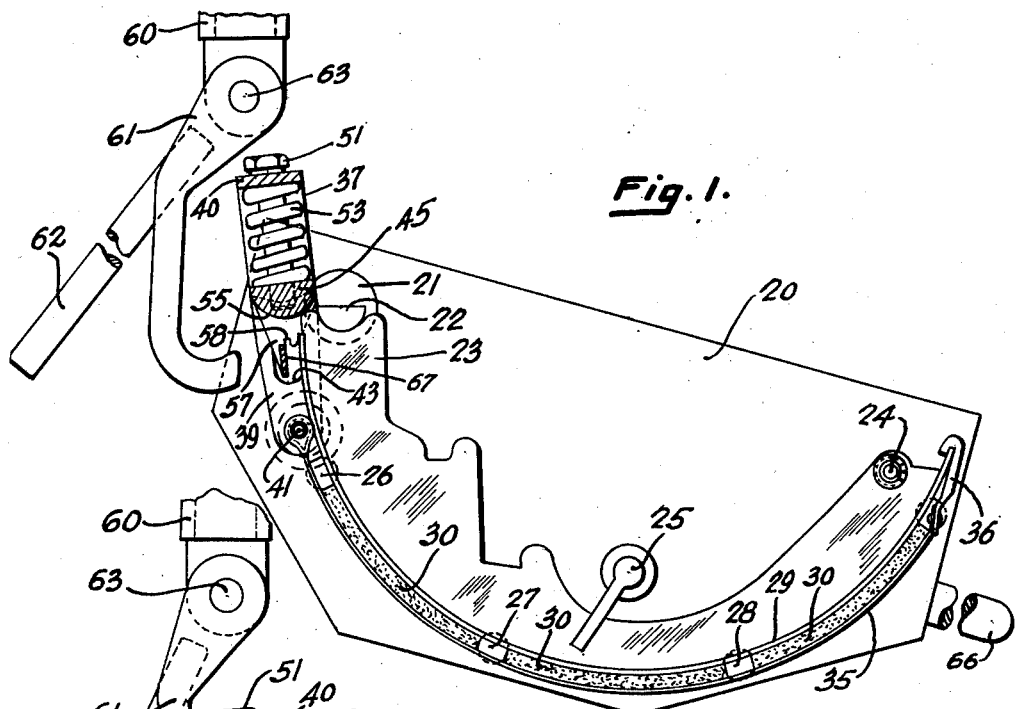
Fig. 1 is a plan view of the apparatus, showing the brake shoe and lining in position on the locating platform.

Referring to the drawings, the apparatus is shown consisting of a platform 20 which is pivotally mounted upon any suitable stationary base, not shown, by means of a pin 21 secured to the base and extending through an opening at one corner of the platform. This pin has a semicircular extension 22 which acts as a locating stop against which one end of the brake shoe 23 abuts. Another pin 24 is carried by the platform 20 adjacent to the corner opposite the opening through which pin 21 extends. This pin 24 is also a locating pin received by a hole in the end of the brake shoe 23 opposite the end abutting against pin portion 22. Thus by means of pin portion 22 and the pin 24, the brake shoe 23 is properly located in position on the platform 20. Any suitable holding device as indicated by the numeral 25 is provided on platform 20, said holding device being operated into engagement with the brake shoe when placed in engagement with pins 22 and 24, rigidly holding the brake shoe on the platform 20. Other locating pins 26, 27 and 28 are provided on the platform 20, these pins being engaged by the curved flange portion 29 of the brake shoe and also acting as locators for the brake lining segments 30 placed against the flange 29 of the brake shoe and bonded thereto.

After the brake shoe is placed and locked in proper position upon the platform 20 and the lining 30 is placed against it as aforedescribed, a clamping band is applied thereto for tightly holding the brake lining segments 30 in intimate contact with the brake shoe flange 29. Although the drawings in this instance show the brake lining to be in separated segments 30, the device may be used by the deletion of the locating pins 26, 27 and 28 for applying a curved, continuous length of brake lining material to cover the entire surface of the flange 29 of the brake shoe.

Figure 2:
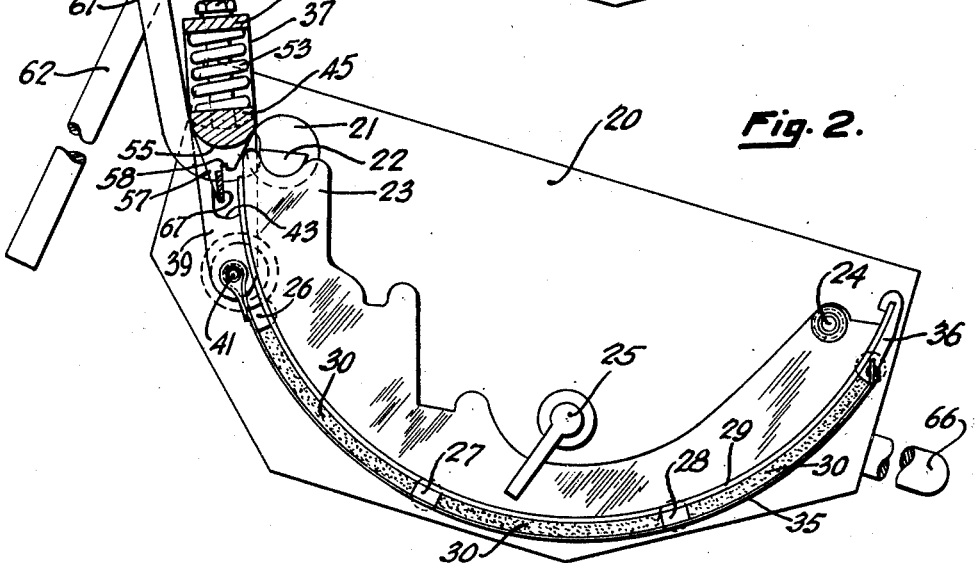
Fig. 2 is a view similar to Fig. 1, however, here the power activated element of the device is shown applied to another member of the apparatus.

The band, for urging the brake lining into intimate contact with the brake shoe for processing purposes, comprises a flexible, heat-resisting strap 35 preferably made of metal. A hook 36 is secured to one end of this strap or band 35, this hook being adapted to fit over and engage the one end of the brake shoe flange 29 as shown in Figs. 1 and 2. At the opposite end of this band, which has a normal curvature coinciding with the curvature of the flange 29 of the brake shoe, there is hingedly secured the tensioning mechanism which consists of a U-shaped saddle 37 having two parallel arm portions 38 and 39 and a connecting web portion or closed end 40. A pin 41 extends through a loop formed on the end of the band 35 opposite its hook 36, this pin having its ends respectively secured to the ends of the parallel arms 38 and 39 of the saddle 37. Each arm of the saddle has a longitudinal slot, the one in arm 38 being designated by the numeral 42, the slot in the arm 39 being designated by the numeral 43. An abutment block 45 is movably carried within the saddle 37, said block having oppositely disposed lug portions which respectively extend into slots 42 and 43, and are slidable therein. Two bolts 50 and 51 extend through holes in the web portion 40 of the saddle, the heads of the bolts engaging the outer surface of said web portion. The inner ends of these bolts threadedly engage the abutment block 45 and thus limit the movement of the block 45 away from the web portion 40 of the saddle 37 under the effect of springs 52 and 53 surrounding the respective bolts 50 and 51 and interposed between the web 40 and the block 45. The springs 52 and 53 are normally under compression when the block 45 is in its limited spaced position relatively to the web portion 40 of the saddle.

Abutment block 45 has oppositely disposed curved surface areas 55 and 56 at opposite sides thereof respectively and between said curved areas there is a depending flange 57 in which a transverse slot 58 is provided.

The strap 35, with its hook 36 at one end and the tensioning device including saddle 37 and its associated parts, comprises the fixture element of the apparatus, said fixture element being adaptable to be removably attached to the brake shoe for holding the brake lining in intimate contact with the brake shoe during processing for the purpose of bonding the brake lining to the brake shoe. When this process is completed, the fixture may be removed from the brake shoe and again used for its intended purpose.

The apparatus of the present invention for attaching and removing the fixture to and from the brake shoe consists of any suitable power actuated shaft or plunger 60, the power device for actuating said plunger not being shown in the present drawings, but, as mentioned, being of any suitable design and supported upon the stationary base which also carries the pivotally mounted platform 20. This power actuated plunger 60 has a hook 61 hingedly secured to the end thereof, this hook being provided with a handle 62 by means of which it may be moved pivotally of the shaft 60.

Figure 7:
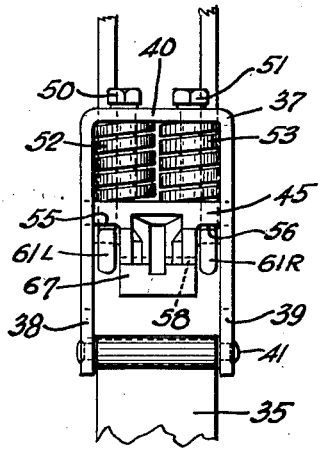
Fig. 7 is a fragmentary front view of the tension member engaged by the power hook.

Fig. 1 shows the platform 20 in the normal loading position relatively to the power actuated plunger 60. It also shows the platform 20 with a brake shoe securely locked thereon in proper position and the clamping band 35 applied to the shoe. When the band 35 and its associated parts are placed upon the shoe as shown in Fig. 1, initially holding the brake lining 30, segmental or of solid length, against the shoe, it will be seen with reference to Fig. 1, that the transverse notch or slot 58 in the depending tongue or flange portion 57 of the abutment block 45 lies beneath the end of the brake shoe flange 29, this end being the end of the brake shoe 23, abutting against the locating pin 22. To secure the band and its associated parts in proper position on the brake shoe the transverse notch or slot 58 must engage and receive the adjacent end of the brake shoe flange 29. In order to accomplish this, the operator, through the medium of the handle 62, moves the hook 61 in a counterclockwise direction as regards Fig. 1, to bring the hook 61 into proper alignment with the curved end portions 55 and 56 of the abutment block 45, which said hook is adapted to engage. Fig. 7 clearly illustrates the hook 61 as comprising two parallel hook portions 61L and 61R terminating in a solid head portion pivotally secured to the power actuated shaft by pin 63 as illustrated in Fig. 1. Fig. 7 clearly shows that the one hook arm 61L engages the arcuated end 55 of the abutment block while the hook arm portion 61R engages the arcuated end 56 of said abutment block. After the operator has moved these hook arms into the space between the respective arms 38 and 39 of the saddle and in proper alignment with the abutment block 45 within the saddle, power is applied to the plunger 60 to move the hook 61 into contacting engagement with the respective block portions 55 and 56. Continual power actuation of the shaft 60, causes its hook portion 61 to move the abutment block 45 within the saddle 37 against the effect of springs 52 and 53, further compressing said spring and also moving the abutment block so that its transverse notch or slot 58 is brought into a position beyond or above the adjacent end of the brake shoe flange 29. The Fig. 2 shows the various parts of the apparatus in position after the hook 61 has been power actuated by the shaft 60.

Figure 3:
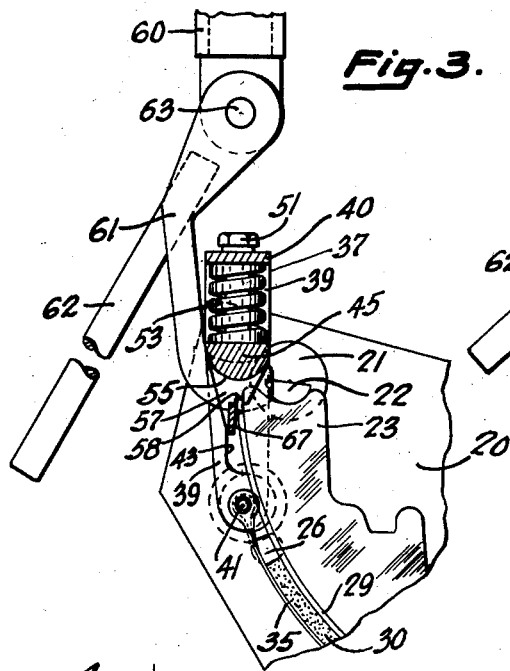
Fig. 3 is a fragmentary view of the apparatus showing the platform after being shifted to align certain parts.
Figure 4:
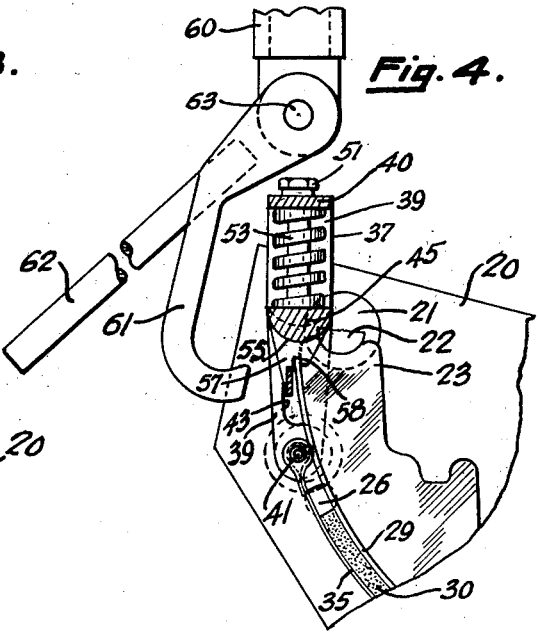
Fig. 4 is a view similar to Fig. 3 with the previously aligned parts, as illustrated by Fig. 3, in engaging position. The sectional portions of Figs. 1, 2, 3 and 4 are all taken along the line 4—4 of Fig. 5.
Figures 5, 6:
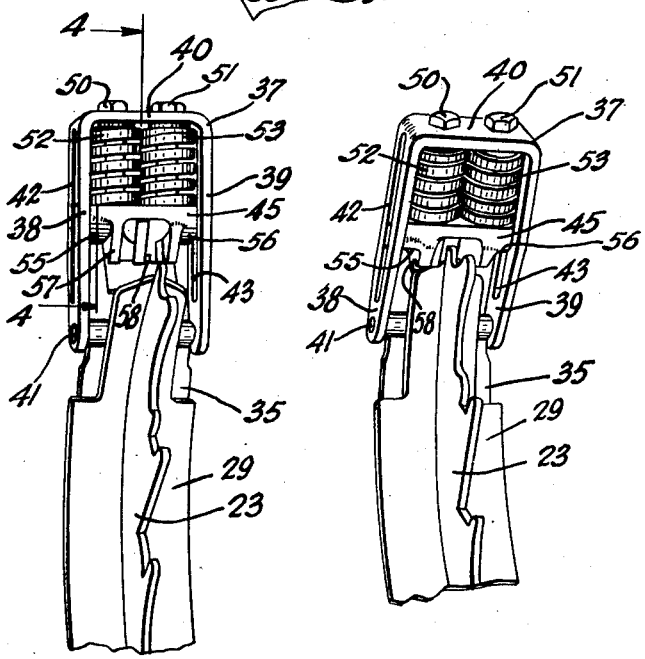
Fig. 5 is a perspective view of a portion of the shoe and clamping band and the tensioning means attached to the band.
Fig. 6 is a view similar to Fig. 5 with the parts in a different relative position, however.

After the apparatus has been so actuated and the notch 58 of the abutment block 45 has been moved beyond or above the end of the brake shoe flange 29, the operator moves the platform 20 by means of handle 66 counterclockwise about the pin 21, bringing the end of the brake shoe lining 29 into alignment with the notch 58 as shown in Fig. 3. It will be seen that the proper alignment of the brake shoe flange 29 and the notch 58 is obtained when the brake shoe flange 29 is moved to engage or abut against the flat surface 67 of the depending flange or tongue 57 on the abutment block by the counterclockwise movement of the platform 20 about its pivotal pin 21. Now the operator removes the power application to plunger 60 and permits its return to normal position and as a result, the hook 61 will permit the return of the abutment block 45 toward its normal position in the saddle under the effect of springs 52 and 53. As the abutment block is moved toward the brake shoe by the springs 52 and 53, the notch 58 of the abutment block 45 will engage and embrace the end of the brake shoe flange 29 adjacent thereto, the springs 52 and 53 pushing the abutment block 45 into pressing contact with this end of the brake shoe flange. The abutment block 45 now resting against the end of the brake shoe flange 29, will cause the force of springs 52 and 53 to act through saddle 37, exerting a pulling effort upon the end of the clamping band 35 hingedly secured to said saddle. Thus the band 35 is drawn and held against the brake lining 30 with a constant force exerted by springs 52 and 53, clamping and holding said brake lining in intimate contact with the brake shoe. The hook 61 is again moved into normal position as shown in Fig. 4 after which the holding element 25 on the platform is actuated to permit removal of the brake shoe from the platform 20 with the clamping fixture attached to the brake shoe.

After the assembled brake shoe 23 is properly processed to bond the brake lining to the shoe, the entire shoe assembly with the clamp thereon is again placed upon the platform 20, secured thereto and by means of the hook 61 and its power actuating device, the fixture may again be removed from the brake shoe. As soon as the hook is moved into grasping position with the abutment block 45 of the tensioning device, as shown in Fig. 2, and power is applied to said hook, the tensioning device with its abutment block 45 is moved to release the brake shoe, that is, the notches 58 are moved out of engagement with the end of the brake shoe flange 29, the platform 20 is moved back to normal position as shown in Fig. 1 and release of the element 25 on the platform then permits removal of the brake shoe with its lining bonded thereupon. The fixture having been removed, is again usable.

From the aforegoing, it may be seen that the apparatus of the present invention provides a sturdy and efficient clamping fixture which is applied to a brake shoe for clamping and holding the lining in intimate contact with the brake shoe. Attaching the clamp to the brake shoe is a simple operation by this apparatus which is also used to remove the clamp just as easily. The fixture of the apparatus is designed to withstand heat and is of a size and weight which does not hinder nor make more difficult the handling of the brake shoe during the heating process for bonding the brake lining to the shoe.

While the embodiment of the present invention as herein disclosed, constitutes a preferred form, it is to be understood that other forms might be adopted.

What is claimed is as follows:

1. Apparatus adapted to attach a fixture to a brake shoe for holding brake lining clamped upon the shoe for attachment processing, comprising in combination, a pivotally movable base providing means for removably holding the shoe and the lining against the shoe; clamping means, one end of which is removably attachable to one end of the shoe and shaped to engage and press the lining upon the shoe; tensioning means hingedly secured to the other end of the clamping means, a member slidably carried by said tensioning means, said member being provided with notches; springs interposed between said member and the tensioning means; a hook carried by a power actuated element, said hook being movable into engagement with the notched member and operative by the power means to actuate said member relatively to the tensioning means for compressing the springs and moving said member so that its notches are beyond the end of the brake shoe adjacent thereto; means for moving the base to align the said adjacent end of the brake shoe with said notches in said member whereby release of the power actuated element will effect expansion of the springs thereby urging the notched member to engage the adjacent end of the brake shoe and cause said tensioning means to pull the clamping means into tight engagement with the brake lining, the shoe, with the lining so clamped thereupon, being removable from the base.

2. Apparatus adapted to attach a fixture to a brake shoe for holding brake lining clamped upon the shoe for attachment processing, comprising in combination, a movable base upon which the brake shoe is removably attached; a flexible, non-stretchable strap removably attachable to one end of the brake shoe and adapted to fit about the lining to hold it upon the brake shoe; a saddle hinged to one end of the strap; a member movably carried by the saddle; a power device; springs interposed between the saddle and member, yieldably holding them in normal spaced positions; a hook carried by the power device and movable into engagement with the said member for moving said member to compress the springs when the power device is rendered active; means for moving the base to locate the brake shoe in juxtaposition with said member whereby said member engages and grasps the end of said shoe and the springs tension the strap through the saddle when the power device is rendered inactive, the hook being detachable from the member and the shoe removable from the base at this time.

3. Apparatus adapted to attach a band to a brake shoe for holding brake lining clamped upon the shoe during attachment processing, said apparatus comprising in combination, a movable base upon which the brake shoe is removably attached; a substantially non-stretchable clamping strap having one end removably attachable to one end of the brake shoe and shaped to engage lining material and press it upon the brake shoe; a tensioning element hingedly secured to the other end of said strap, said element consisting of a saddle and an abutment member slidably carried by the saddle; springs interposed between the saddle and said member; a hook carried by a power actuated device, said hook being movable into engagement with the abutment member whereby, when the power device is activated, said abutment member is moved in the saddle to compress the springs and to move said member into a predetermined position relatively to the adjacent end of the brake shoe; means on the base for moving it to bring said adjacent end of the brake shoe into alignment with the abutment member which, when said power device is deactivated, is moved by the springs to engage and clamp upon said adjacent brake shoe end whereby the springs, acting through the saddle, tension the strap to hold the lining to the shoe, said shoe being removable from the base for further processing.

4. Apparatus adapted to attach a band to a brake shoe for holding brake lining clamped upon the shoe during attachment processing, said apparatus comprising in combination, a base pivotally supported and adapted to have a brake shoe removably attached thereto; a flexible non-stretchable clamping band having a hook end adapted to fit over one end of the brake shoe for removably securing it thereto, the other end of the band having the two ends of a U-shaped saddle hinged thereto; an abutment block slidably carried in the saddle; springs interposed between the closed end of the saddle and the abutment block, urging the block toward the ends of the saddle hinged to the band; bolts on the saddle and engaging the block for limiting its movement by the springs; a power actuated hook movable into engagement only with the abutment block, said hook when power actuated, moving the block to compress the springs and predeterminately locate the block relatively to the adjacent end of the brake shoe on the base; means operative to turn the base for aligning said adjacent brake shoe end with the abutment block, whereby, when the power actuated hook is freed, said abutment block is moved into clamping engagement with said adjacent end of the brake shoe by the springs which effect a pulling effort through the saddle upon the band tightly to clamp brake lining upon the shoe which is then removable from the base for further processing.

5. Apparatus adapted to attach a band to a brake shoe for holding brake lining clamped upon the shoe during attachment processing, said apparatus comprising in combination, a pivotally mounted platform adapted to have a brake shoe detachably secured thereto, said base having provisions for locating brake lining segments relatively to the shoe to which said segments are to be attached; a flexible and substantially non-stretchable clamping band adapted to press and hold the segments against the shoe, one end of said band being detachably secured to one end of the shoe, the other end of said band having the end of the two parallel arms of a U-shaped saddle hingedly attached thereto; an abutment block slidably supported in the saddle between its two parallel arms; springs interposed between the block and the closed end of the saddles; means between the block and saddle, operative to limit the movement of the block toward the hinged ends of the saddle by the springs; brake shoe engaging slots in said block; a power actuated device; a hook pivotally secured to the said device and movable into engagement with the abutment block for moving said block in the saddle against the effect of the springs when said power device is activated, whereby the slots in the abutment block are moved into predetermined position beyond the end of the adjacent brake shoe; means operative to turn the shoe supporting platform for moving the said adjacent end of the brake shoe into alignment with the slots in the abutment block, whereby release of the power actuated hook permits the springs to move the abutment block so that its slots are urged into clamping engagement with the aligned end of the brake shoe thereby causing the saddle to exert a tensioning force on the band under the effect of the springs, release of the abutment block by the hook permitting removal of the brake shoe with lining segments clamped thereupon.

6. Apparatus for securing a lining clamp upon a brake shoe for purposes of further lining attachment processing, said apparatus comprising in combination, a platform upon which the shoe is rigidly secured with lining placed in proper position thereon; a flexible, non-stretchable band for holding the lining against the shoe, one end of the band being hooked upon one end of the shoe; a spring loaded, compressible tensioning device pivotally attached to the other end of the band and having means normally free from but engageable with the brake shoe; means movable into engagement with said tensioning device; a power device operative to actuate said means for compressing and adjusting the tensioning device to move it into predetermined position relatively to the other end of the shoe; and means for actuating the platform to align the said other end of the shoe with the tensioning device so that, when said power device is rendered inactive, the tensioning device will be expanded and engage the shoe to exert a tensioning force upon the band tightly to clamp it against the lining on the shoe, said shoe then being removable from the platform with the lining maintained in clamped position upon said shoe by the band.

7. A clamp removably attachable to the arcuated rim of a brake shoe for pressing brake lining upon said rim, said clamp consisting of a flexible and substantially unstretchable strap having means at one end thereof for attachment to one end of a brake shoe rim; a saddle hingedly secured to the opposite end of said strap; an abutment member slidably carried in the saddle and provided with notch means for engaging and fitting over the other end of the brake shoe rim; and spring means interposed between said member and said saddle, said spring means normally, yieldably holding said member in a position in the saddle in which the notch means of said member are short of the end of the brake shoe rim when the one end of the strap is attached to the rim, thereby necessitating compression of said spring means by movement of said member relatively to the saddle for permitting the notch means in said member to engage and fit over the other end of the brake shoe rim, whereby the strap is tensioned and urged against the lining to clamp it upon the brake shoe rim.

8. A clamp removably attachable to the arcuated rim of a brake shoe for pressing brake lining upon said rim, said clamp consisting of a flexible and substantially unstretchable strap having means at one end for attachment to one end of a brake shoe rim; a saddle hingedly secured at one end thereof to the opposite end of said strap, an abutment member slidably carried in the saddle intermediate the ends thereof and having notches for engaging and fitting over the other end of the brake shoe rim; resilient means interposed between said saddle and said abutment member urging them into normal, relative spaced positions in which the notches in the abutment member are short of and can not engage the end of the brake shoe rim when said strap is attached to one end of the rim until the members are relatively moved to compress said resilient means substantially permitting the notched member to engage and grasp the other end of the brake shoe rim whereupon said resilient means exerts a tensioning force upon the strap to clamp the lining material upon the rim of the brake shoe.

9. A clamp removably attachable to the arcuated rim of a brake shoe for pressing brake lining upon said rim, said clamp consisting of a flexible and substantially unstretchable strap having means at one end for attachment to one end of a brake shoe rim; a U-shaped saddle hingedly secured at the arm ends of the U-shaped saddle to the opposite end of said strap, an abutment member slidably carried in the saddle intermediate the ends thereof and having means for fitting over and grasping the other end of the shoe rim; and resilient means interposed between said saddle and said abutment member, said resilient means yieldably normally holding the two members in spaced positions relatively, as to require compression of said resilient means by the movement of said other member into shoe rim engaging and grasping position.

EDWARD J. VOSLER.

References Cited in the file of this patent

UNITED STATES PATENTS

| Number | Name | Date |
|---|---|---|
| 1,600,672 | Janowski | Sept. 21, 1926 |
| 2,513,800 | Hendrick | July 4, 1950 |
| 2,554,297 | Crossman | May 22, 1951 |